(12) United States Patent
Tuckey et al.

(10) Patent No.: US 10,566,786 B2
(45) Date of Patent: Feb. 18, 2020

(54) FAULT CURRENT ENHANCEMENT FOR ENERGY RESOURCES WITH POWER ELECTRONIC INTERFACE

(71) Applicant: ABB Schweiz AG

(72) Inventors: Andrew Tuckey, Livingstone (AT); Juergen Zimmerman, Fannie Bay (AT)

(73) Assignee: ABB Schweiz AG, Baden (CH)

( * ) Notice: Subject to any disclaimer, the term of this patent is extended or adjusted under 35 U.S.C. 154(b) by 234 days.

(21) Appl. No.: 15/837,514

(22) Filed: Dec. 11, 2017

(65) Prior Publication Data

US 2018/0102638 A1     Apr. 12, 2018

Related U.S. Application Data

(63) Continuation of application No. PCT/EP2016/063055, filed on Jun. 8, 2016.

(30) Foreign Application Priority Data

Jun. 9, 2015 (EP) ..................................... 15171201

(51) Int. Cl.
*H02H 7/26* (2006.01)
*H02J 3/38* (2006.01)
*H02H 7/122* (2006.01)

(52) U.S. Cl.
CPC .................. *H02H 7/26* (2013.01); *H02J 3/38* (2013.01); *H02H 7/1227* (2013.01)

(58) Field of Classification Search
CPC ............ H02H 7/26; H02H 7/1227; H02J 3/38
See application file for complete search history.

(56) References Cited

U.S. PATENT DOCUMENTS

2012/0302112 A1   11/2012   Hartig et al.

FOREIGN PATENT DOCUMENTS

CA        2840769 A1    6/2014
WO     2009076640 A2    6/2009
(Continued)

OTHER PUBLICATIONS

WO 2009/076640; Publication Date: Jun. 18, 2009; Title: the Electric power distribution methods and apparatus; Inventor: McDonnell (Year: 2009).*

(Continued)

*Primary Examiner* — Dharti H Patel
(74) *Attorney, Agent, or Firm* — Taft Stettinius & Hollister LLP; J. Bruce Schelkopf (57) ABSTRACT

The present invention is concerned with a fault current enhancement for triggering a protection device, such as a fuse or circuit breaker or protection relay used in protecting a distribution line of a power distribution network in an efficient and economical way. An Induction Machine (IM) is operated in parallel with an energy source connected to the distribution line via a Power Electronics (PE) interface, to provide a fault current characteristic of the composite PE interface and IM similar to that of a synchronous generator. Comparable fault currents enable a same protection device to be provided for protecting the distribution line irrespective of a kind of interface used to source energy to the distribution line.

25 Claims, 7 Drawing Sheets

(56) References Cited

FOREIGN PATENT DOCUMENTS

WO         2010060903 A1     6/2010
WO         2015003729 A1     1/2015

OTHER PUBLICATIONS

WO 2010/060903; Publication date: Jun. 3, 2010; Title: a method and device for facilitating the localisation of a fault in grid; inventor : Martinez Garcia Jorge; (Year: 2010).*
European Patent Office, International Search Report & Written Opinion issued in corresponding Application No. PCT/EP2016/063055, dated Aug. 3, 2016, 11 pp.
European Patent Office, International Preliminary Report on Patentability issued in corresponding Application No. PCT/EP2016/063055, dated May 18, 2017, 15 pp.
European Patent Office, Extended Search Report issued in corresponding Application No. 15171201.5, dated Nov. 25, 2015, 6 pp.

\* cited by examiner

FAULT CURRENT ENHANCEMENT FOR ENERGY RESOURCES WITH POWER ELECTRONIC INTERFACE

FIELD OF THE INVENTION

The invention relates to the field of electric power distribution networks, in particular to fault protection of distribution feeder lines sourced from power electronics interfaced distributed energy resources.

BACKGROUND OF THE INVENTION

Power distribution networks are operating at medium voltages between 1 kV and 72 kV and provide electrical power to a plurality of electrical power consumers along a distribution feeder line. The distribution network is protected by a protection system with various protection devices and adapted to disconnect parts of the distribution network from the rest of the distribution network in case of a fault. While the conventional power distribution grid is a passive grid without local energy sources and fully supplied by a transmission grid, more recent focus on renewable energy including photovoltaic systems, small scale hydroelectric power generators, wind turbines and/or gas turbines using biogas, has seen small and medium size Distributed Energy Resources (DER) appear in the distribution grid. With a large amount of controllable and coordinated DER a part of the distribution grid can intentionally disconnect from the transmission grid in emergency cases and continue operation in an islanded mode.

Most electrical energy generation is done by converting energy sources into rotating kinetic energy, and then converting the latter into electrical energy via a synchronous generator. Renewable energy sources such wind and solar power include a final conversion into electrical energy via a Power Electronics (PE) interface including converters or inverters based on power electronic semiconductor components. In addition, energy storage systems such as a flywheel, battery, super conductor or super capacitor energy storage systems also typically use a PE interface as the final conversion method.

In case of a short circuit in a power system a large amount of fault current is produced, which in turn is used to trip protection devices such as circuit breakers or protection relays, and/or blow single-use fuses by melting a fusing conductor inside the fuse. The fault current capability and fault current characteristic of a PE interface may be very different to that of a synchronous generator, to the point that some protection devices used in power systems will not operate as intended. For example a fuse will blow in a short time when subject to fault current sourced from a synchronous generator, but will take too long to blow when the fault current source is a PE interface. Besides increasing, at the expense of additional cost and space, a rating or size of an inverter of the PE interface, conventional solutions to this problem include the following approaches.

i) The settings on protection devices are changed to more sensitive values. When using this solution a different setting will be required for operation with just the PE interfaced energy sources and for operation with a synchronous generator. A third setting may be required for multiple synchronous generators being used since the fault current then will be larger. Yet a fourth setting may be required to avoid false trips when performing cold-load pickup or black starting.

ii) In the case when fuses are used as protection devices, no adaptable settings are available, but the rating or type of fuse may have to be changed to ensure satisfactory operation when subject to fault current from a PE interface. A potential problem with this solution is that careful selection of the fuse size and type is required to make sure discrimination of downstream protection is maintained, and to prevent a downstream fault from blowing the fuse instead of tripping a circuit breaker in the vicinity of the fault. Furthermore a fuse rating and type suitable for the fault current from the PE interface may falsely blow during cold-load pickup.

iii) A synchronous compensator is operated online and providing fault current similar to a synchronous generator. A synchronous compensator uses a synchronous machine to provide voltage control or correct power factor in a power system and has the additional effect of being able to provide fault current similar to a synchronous generator. A drawback of this method is the additional cost and space and loss and operating cost of the synchronous compensator.

iv) A diesel generator is operated online with the prime mover disconnected from the synchronous generator, together with a flywheel or other inertia added to the synchronous generator resulting in a so-called Diesel Uninterruptable Power Supply or D-UPS. In addition to the inertia and UPS capabilities, the synchronous generator provides additional fault current. A drawback of this method is the additional investment cost, space requirement, operating loss and cost of the conventional/diesel generator or D-UPS.

An Induction Machine (IM) is an asynchronous machine operable as an induction motor, as an induction generator, or both. The IM is a type of alternating current (AC) electrical machine that uses the principles of electromagnetic induction to generate the AC currents in the rotor windings. Accordingly, in generator operation, a prime mover from a turbine or engine drives the rotor above the synchronous speed with a negative slip, while in motor operation the shaft provides torque to the load and the rotor operates below synchronous speed with a positive slip.

DESCRIPTION OF THE INVENTION

It is therefore an objective of the invention to enhance a fault current for triggering a protection device, such as a fuse, circuit breaker or protection relay protecting a distribution line of a power distribution network in an efficient and economical way. This objective is achieved by a power distribution system, a method of operating a power distribution system, and use of an induction machine according to the independent claims. Preferred embodiments are evident from the dependent patent claims.

According to the invention, an Induction Machine (IM) is connected in parallel with an energy source connected to the distribution line via a Power Electronics (PE) interface. The Induction Machine will act or is configured to act as a motor, in particular as an asynchronous motor, during regular operation of the power distribution system, i.e. in the absence of any fault the power distribution system, i.e. during a no fault condition. Preferably, the Induction Machine is at least essentially mechanically isolated, i.e. does neither provide a substantial amount of work to any kind of external equipment or machinery, nor is any substantial amount of work provided to the Induction Machine by any kind of external equipment or machinery. In particular, for an active power rating of the Induction Machine $P_{IM}$, an amount of work Him provided by or to the Induction Machine shall, preferably at all times, be negligible in comparison, i.e. $W_{IM} \ll P_{IM}$, preferably $1000 W_{IM} < P_{IM}$. A fault current characteristic as provided by the composite PE interface and IM similar to that of a synchronous generator my thus be obtained. Comparable fault currents enable the same protection device to be provided for protecting the distribution line irrespective of a kind of interface used to source energy to the distribution line.

Specifically, a medium voltage power distribution system with a nominal voltage between 1 kV and 72 kV and with a distribution feeder is protected by a protection device such as a fuse, circuit breaker or protection relay against faults occurring downstream of the protection device. A first energy source such as a renewable energy source, in particular a photovoltaic system, a small scale hydroelectric power generator, a wind turbine and/or a gas turbines using biogas, or an energy storage, in particular an energy storage comprising a flywheel, a battery, a super conductor or a super capacitor energy storage system, is connected, via a Power Electronics (PE) interface including a converter or an inverter, to the distribution feeder upstream of the protection device and causing the protection device to clear, or blow, within a first, extended fault clearance time following a downstream fault. Windings of an Induction Machine (IM) are electrically connected to the feeder upstream of the protection device and in parallel to the PE interface, and a rotor of the IM is preferably rotated, at least essentially, without exchange of work or mechanical energy via a shaft of the IM. Preferably, there is thus no prime mover or load connected to the IM, and there is no torque applied to the shaft of the IM other than the electromagnetic forces between stator and rotor winding currents. The IM is adapted, or sized, to provide, together with the PE interface of the first energy source, a fault current in the distribution feeder causing the protection device to clear within a second, reduced fault clearance time following the downstream fault. Preferably, the second fault clearance time is shorter than the first fault clearance time, with the second fault clearance time preferably being significantly lower than the first fault clearance time, in particular less than half of the first fault clearance time.

Appropriate sizing of the IM is preferably achieved by selecting an IM having a first power rating that is at least approximately in the same order of magnitude as a second power rating of the first energy source. In particular, if an active power rating $P_1$ of the first energy source and/or the Power Electronics (PE) interface is given, the active power rating of the Induction Machine $P_{IM}$, is preferably chosen according to $P_1/10 < P_{IM} < 5\ P_1$, more preferably according to $P_1/5 < P_{IM} < 3\ P_1$, most preferably according to $P_1/2 < P_{IM} < 2\ P_1$. Similarly, if an apparent power rating $|S_1|$ of the first energy source and/or the power electronics interface is given, the apparent power rating of the Induction Machine $|S_{IM}|$, is preferably chosen according to $|S_1|/10 < |S_{IM}| < 5|S_1|$, more preferably according to $|S_1|/5 < |S_{IM}| < 3|S_1|$, most preferably according to $|S_1|/2 < |S_{IM}| < 2|S_1|$.

More generally, if one or more first energy sources as described above are present in and/or may provide power to the power distribution system, whereby a total active power rating $P_{1,\ total}$ corresponding to a sum of the individual active power ratings $P_1$ of the one or more first energy sources and/or their power electronics (PE) interfaces is given, one or more induction machines may be operated in parallel, with a total active power rating $P_{IM,\ total}$ corresponding to a some of individual power rating $P_{IM}$ of the induction machines, is preferably chosen according to $P_{1,\ total}/10 < P_{IM,\ total} < 5\ P_{1,\ total}$, more preferably according to $P_{1,\ total}/5 < P_{IM,\ total} < 3\ P_{1,\ total}$, most preferably according to $P_{1,\ total}/2 < P_{IM,\ total} < 2\ P_{1,\ total}$. Similarly, if a total apparent power rating $|S_{1,\ total}|$ of the one or more first energy sources and/or their power electronics interfaces is given, a total apparent power rating of the Induction Machine $|S_{IM,\ total}|$, is preferably chosen according to $|S_{1,\ total}|/10 < |S_{IM,\ total}| < 5|S_{1,\ total}|$, more preferably according to $|S_{1,\ total}|/5 < |S_{IM,\ total}| < 3|S_{1,\ total}|$, most preferably according to $|S_{1,\ total}|/2 < |S_{IM,\ total}| < 2|S_{1,\ total}|$.

In the absence of a fault condition, in particular during steady-state operation, the IM or the IMs is/are acting as a motor, drawing a small amount of power from the grid in order to maintain the rotor speed. In case of a fault as described, a fraction of the kinetic energy stored in the rotating parts of the IM is converted to electrical energy and injected into the grid in a relatively short amount of time, resulting in a deceleration of the rotor. The kinetic energy or inertia stored in the rotor and the magnetic field surrounding the rotating rotor result in a fault current, in particular a reactive fault current, injected into the grid when a fault occurs.

In preferred variants of the invention, a second energy source is connected via a synchronous generator to the distribution feeder upstream of the protection device. The synchronous generator, the PE interface, and the IM may be connected to the distribution feeder directly, via dedicated transformers or sharing a joint transformer, wherein the induction machine is preferably connected to the distribution feeder without any power electronics interface, converter or inverter. The IM may be disconnected or idle when the synchronous generator is connected to the distribution feeder to provide a sufficient fault current to clear the fault. In this variant, appropriate sizing of the IM may alternatively be achieved by selecting an IM having a first power rating that is at least approximately in the same order of magnitude as a third power rating of the second energy source. In particular, if an active power rating $P_2$ of the second energy source and/or the synchronous generator is given, the active power rating of the Induction Machine $P_{IM}$ is preferably chosen according to $P_2/10 < P_{IM} < 5\ P_2$, more preferably according to $P_2/5 < P_{IM} < 3\ P_2$, most preferably according to $P_2/2 < P_{IM} < 2\ P_2$. Similarly, if an apparent power rating $|S_2|$ of the second energy source and/or the synchronous generator is given, the apparent power rating of the Induction Machine $|S_{IM}|$, is preferably chosen according to $|S_2|/10 < |S_{IM}| < 5|S_2|$, more preferably according to $|S_2|/5 < |S_{IM}| < 3|S_2|$, most preferably according to $|S_2|/2 < |S_{IM}| < 2|S_2|$.

BRIEF DESCRIPTION OF THE DRAWINGS

The subject matter of the invention will be explained in more detail in the following text with reference to preferred exemplary embodiments which are illustrated in the attached drawings, in which.

DETAILED DESCRIPTION OF PREFERRED EMBODIMENTS

Figure 1:
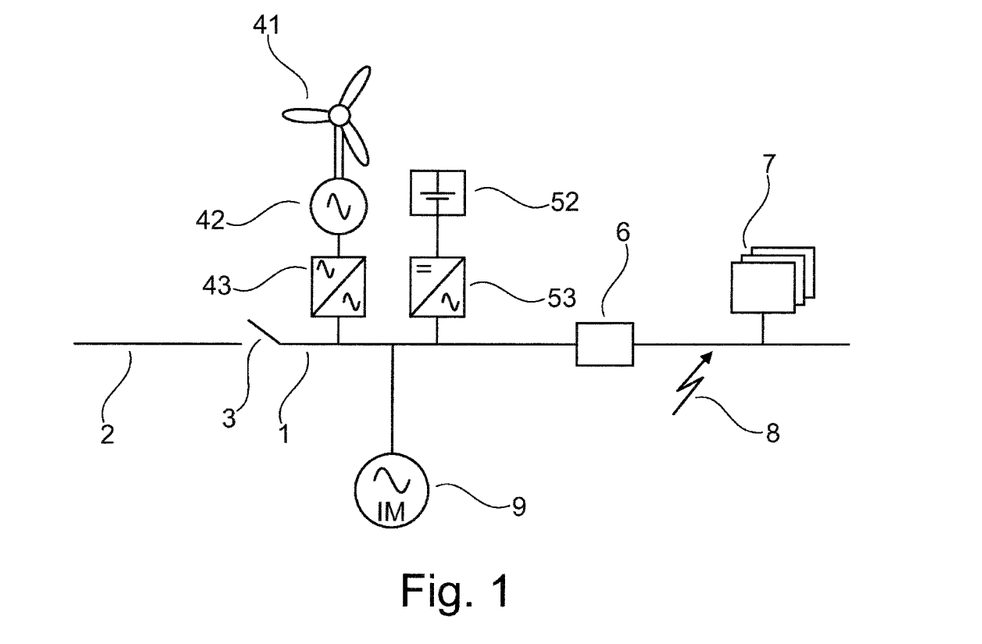
FIG. 1 depicts a power distribution system with a distribution feeder protected by a fuse.

FIG. 1 depicts a power distribution line or feeder 1 connectable to a transmission or main power network 2 via a main circuit breaker 3. Wind energy as an exemplary first energy source drives a wind turbine 41 which in turn is mechanically connected to a generator 42. The latter is electrically connected to the distribution line via a Power Electronics (PE) interface including an AC/AC inverter 43. Alternatively or in parallel, a battery 52 as an exemplary second energy source is electrically connected to the distribution line via a PE interface including DC/AC converter 53. In general, any kind of energy source or Distributed Energy Resource (DER) may be connected to the line via suitable PE interface, specifically, a flywheel energy storage may replace the wind turbine, or a photovoltaic panel may replace the battery. In an island or microgrid mode with the main circuit breaker being open, a protection device 6 such as a fuse or circuit breaker or protection relay protects the distribution line and or loads 7 connected to the line against faults 8 occurring downstream of the protection device, i.e. on a side of the protection device opposing the PE interface. An Induction Machine (IM) 9 is connected to the distribution line in parallel with the PE interfaces and upstream of the protection device. Transformers may be present to transform the output voltage of the converter or inverter and/or the voltage of the IM to the grid voltage of the distribution line.

In the context of the present invention, there is no prime mover connected to the IM, and there is no torque applied to the shaft of the IM other than the electromagnetic forces between stator and rotor winding currents. During steady-state operation, the shaft just spins by itself, and the IM is drawing a small amount of power from the grid in order to maintain the rotor speed. In case of a fault as described a fraction of the kinetic energy stored in the rotating parts of the IM is converted to electrical energy and injected to the grid in a relatively short amount of time, resulting in a deceleration of the rotor. The kinetic energy stored in the rotor and the magnetic field surrounding the rotating rotor have the result of injecting fault current into the grid when a fault occurs. The IM is expected to provide a maximum fault current for the lowest cost, loss, and maintenance, double cage or deep bar type IMs for this reason are preferred.

Figure 2:
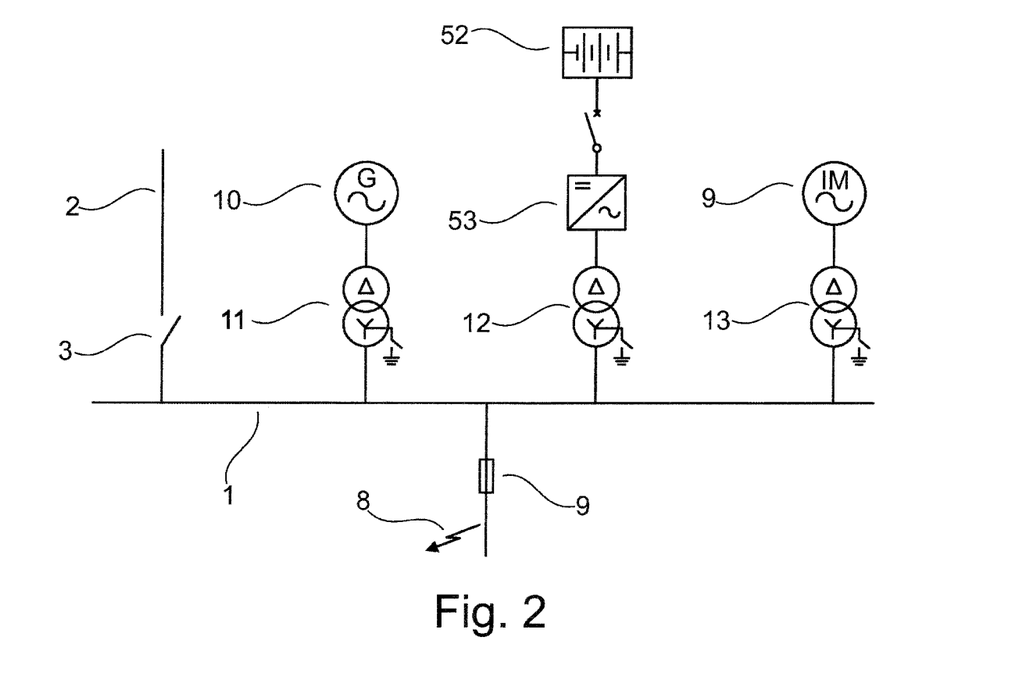
FIG. 2 depicts a concurrent use of two types of energy source interfaces.

FIG. 2 depicts an embodiment of the invention with two types of energy source interfaces provided concurrently. A synchronous generator interface 10 represents a conventional rotating machine interface for energy sources. The synchronous generator interface is connected to the distribution line 1 through a Delta-Wye transformer 11. The transmission grid 2 connection is shown as upstream to the top left of the figure and loads are connectable downstream. The protection devices shown is a fuse 6, wherein a protection relay or a circuit breaker may be used alternatively, and fault 8 is downstream of the protection device. Whenever the synchronous generator is in operation and a downstream fault occurs the initial fault current is large, and the fuse will be blown in a short fuse clearing time of 329 ms.

A second type of energy source interface includes a PE interface 53 with a battery 52 as the energy source. The PE interface is connected to the distribution line via a second Delta-Wye transformer 12. Whenever the PE interface is in exclusive operation and a downstream fault occurs the fault current is constant, and the fuse will blow in a longer fuse clearing time of 941 ms.

In the embodiment of FIG. 2, the IM 9 is likewise connected to distribution line via a third Delta-Wye transformer 13, and thus operated in parallel with the PE interface. Accordingly, the IM may be housed with the PE interface, but may also be located elsewhere within the power generation space. In the embodiment of FIG. 2, synchronous generator interface and PE interface and IM interface are shown with individual transformers but this is in no way mandatory. A common multi-winding transformer may be preferred over individual transformers, or some combination of common and multi-winding transformers may be preferred for cost reasons. When the PE interface and the IM are both online and a downstream fault occurs the fault current is the sum of the IM fault current and the PE interface fault current. The IM has a large fault current very similar to the subtransient fault current characteristic of the synchronous generator. This fault current however decreases to zero in a short time of about 250 ms. As stated above the PE interface has a constant fault current. The combination of these two capabilities results in the fault current shown in FIG. 3 with the result that the fuse blows in a fuse clearing time of 411 ms; a much shorter time than the PE interface on its own.

Figure 3:
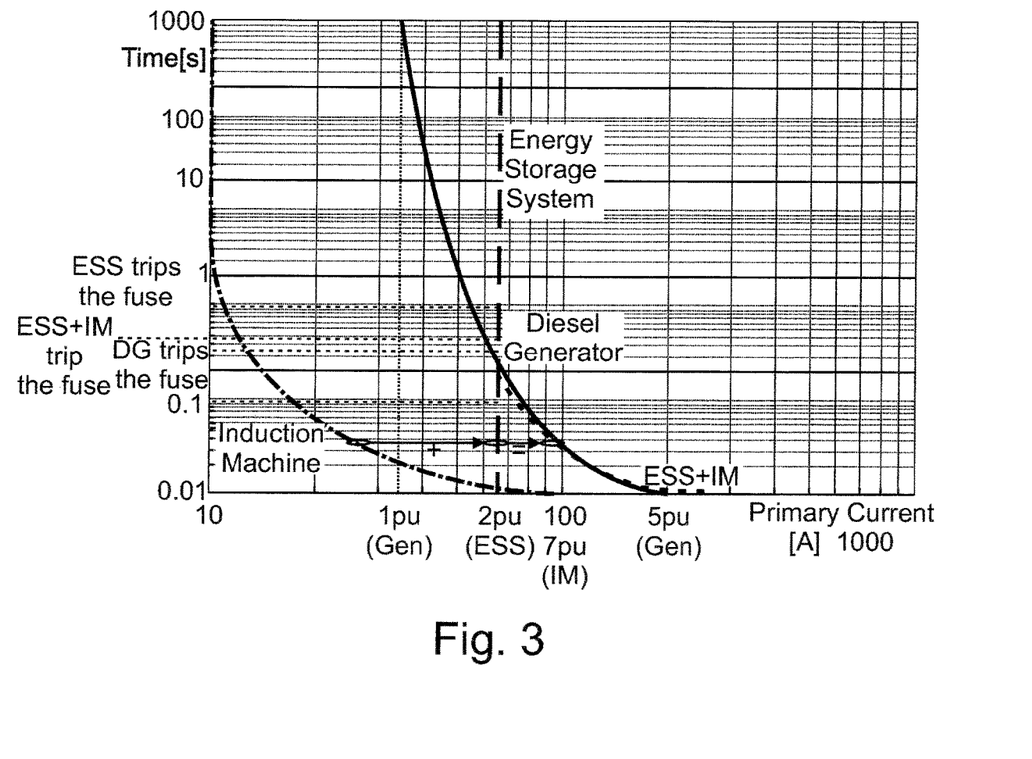
FIG. 3 depicts a diagram with simulated fault current characteristics.

FIG. 3 shows a logarithmic diagram with simulated fault current characteristics for the embodiment of FIG. 2 following a downstream fault on a 22 kV distribution line, including fuse clearing times for all components as reported above. The continuous line represents a diesel-powered synchronous generator with a peak fault current starting at 5 pu current reducing to 1 pu in the steady-state (relative to generator rating). The long dashed line represents the PE interfaced energy storage system with a 2 pu constant fault current capability (relative to the PE interface rating). The dash-dot line represents the IM fault current with a peak fault current being 7 pu (relative to IM rated current) reducing to practically zero current in the steady-state. Finally, the short dash (broken) line represents the composite PE interface plus IM fault current as indicated by the "plus" and "equal" signs. This composite line is hidden behind the PE line for times greater than 0.25 seconds.

The invention may be used in other applications where an increase in initial fault current is required. This may be the case where only a limited number of small synchronous generators are used, or where small synchronous generators and PE interfaces are used together, such as in a hybrid solar/diesel or wind/diesel power generation systems. The invention could also be used in concert with energy source interfaces that are not entirely PE based, but have low fault current capability. Examples include, but are not limited to, wind turbine generators that use double-fed induction generators, squirrel cage induction generators, or full PE interfaces, wave, tidal generators, micro-hydro generators and others.

Advantages of the presented solution of enhancing fault current include

The IM is less expensive than additional inverter modules or a larger inverter;

Operating loss and operating maintenance cost of the IM are low;

The IM can be turned off to reduce loss and maintenance if not required, such as when a synchronous generator is also online providing additional fault current;

The IM is simple to start or power, either direct-on-line or via a thyristor- or Wye/Delta-type soft-starter; wherein the soft-starter equipment itself should not reduce the fault current or trip when a fault occurs.

Figure 4:
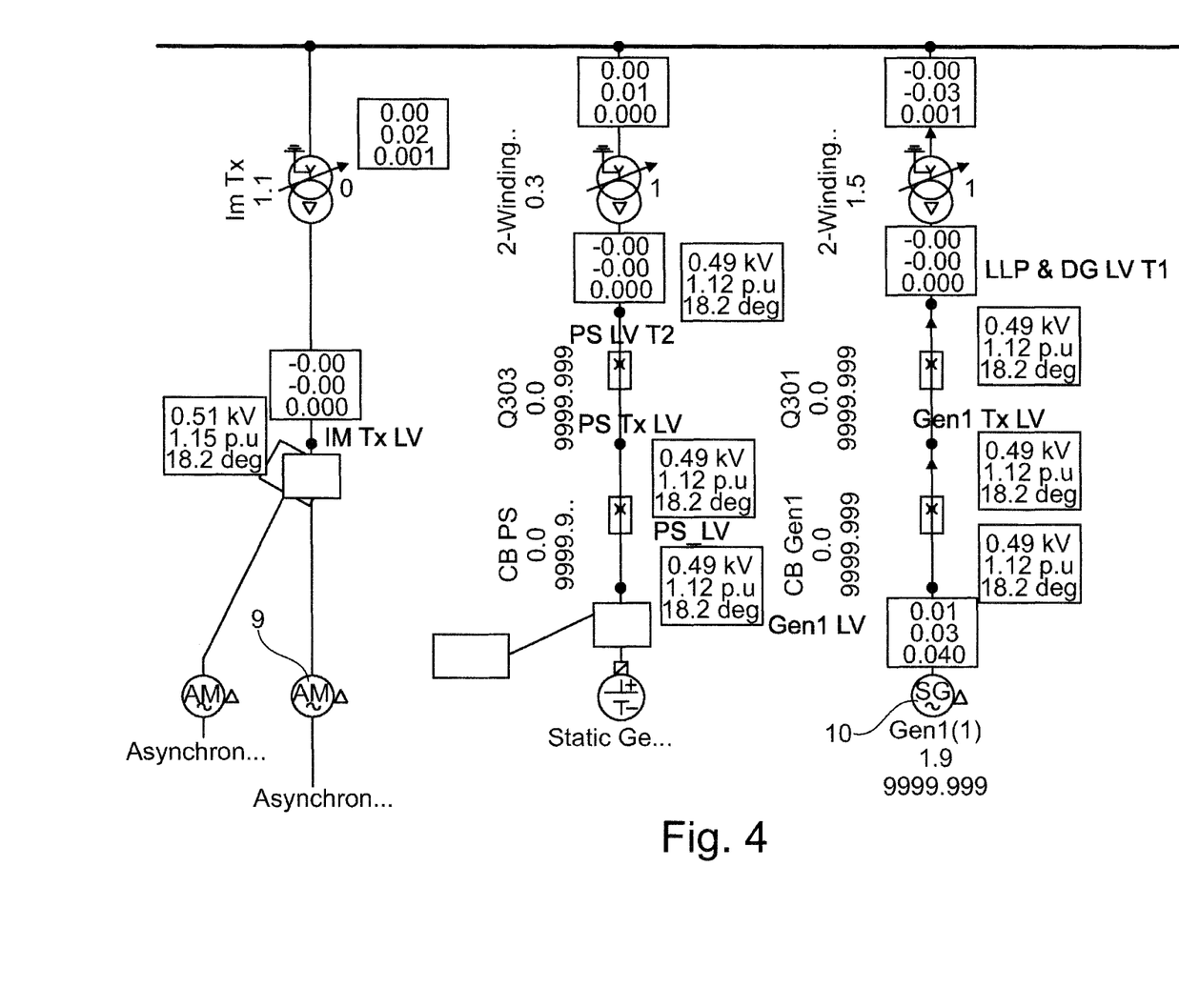
FIG. 4 depicts a single line diagram of a power distribution system used for simulation purposes.
Figure 5:
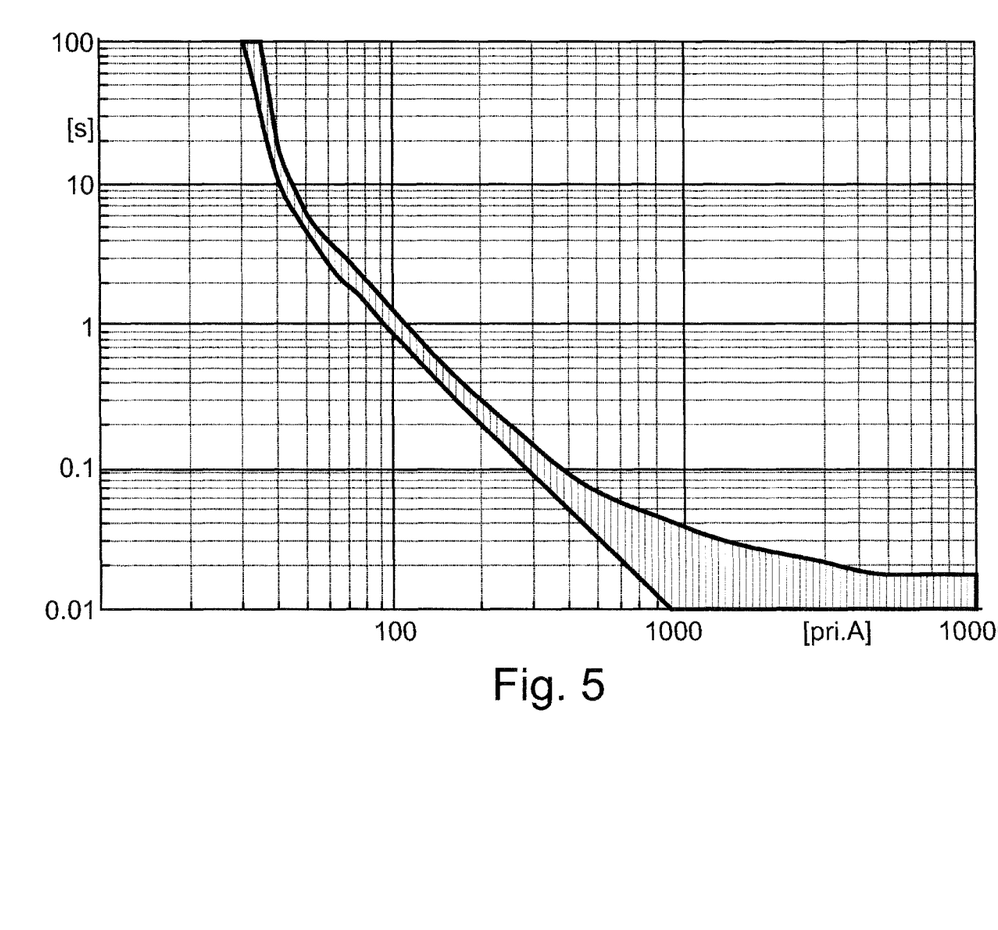
FIG. 5 depicts a characteristic of a medium voltage fuse provided as protection device in simulations.

In order to verify a practical usability of the method in accordance with the invention, a number of simulations have been carried based on the embodiment as shown in FIG. 2, wherein it was assumed that the synchronous generator has an active power rating of $P_2$=1.25 MW and an apparent power rating of $|S_2|$=1.8 MVA. FIG. 4 shows a more detailed single line diagram of the power distribution system used in the simulations. A medium voltage fuse having a characteristic as shown in FIG. 5 for 22.0 kV is provided as protection device 6.

For the purpose of the simulations, an induction machine with the following exemplary characteristics was chosen:
- An active power rating of $P_{IM}$=1.25 MW
- An apparent power rating of $|S_{IM}|$=1.8 MVA
- Type: one pole pair, 2978 rpm, double cage induction machine (use of a 1 pole pair/2978 rpm induction machine was found to give much better performance compared to a standard 2 pole pair/1489 rpm induction machine)
- The induction machine should most preferably be of squirrel cage type
- A double cage induction machine was found to allow for much better performance compared to a single cage induction machine
- Preferably, the induction machine is chosen to have low leakage inductance which increases the initial fault current. This is typical of double cage induction motors used for high starting torque
- An induction machine with high inertia is preferably used; this also increases the duration of the fault current because the motor doesn't slow down much during the fault
- The induction machine is preferably run with no mechanical load, except for the usual shaft-mounted cooling fan, which forms an internal part of the motor For the purpose of the simulations, it was further assumed that the induction machine is connected to the distribution line via a transformer of type YNd, with neutral connected to earth in order to provide the ability of providing zero-sequence fault current. The transformer preferably also has an active power rating of $P_{trans}$=1.25 MW and an apparent power rating of $|S_{trans}|$=1.8 MVA. Preferably, a low leakage transformer with a leakage of 1-10%, preferably at least approximately 5.5% to 6.5% leakage is used. If lower leakage can be achieved then a smaller transformer could also advantageously be used (e.g. if a leakage between 2% and 4%, preferably at least approximately 3% is achieved, then a 0.9 MVA transformer could be used). A minimum size of the transformer is that it has to be big enough to handle a no-load current of the induction machine.

Figure 6:
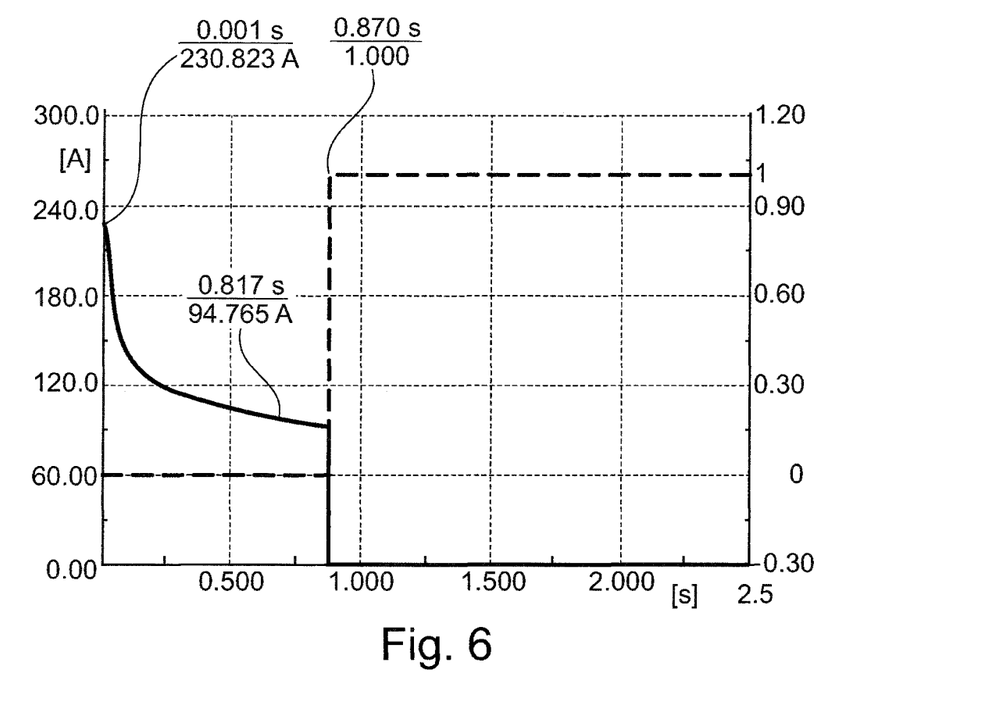
FIG. 6 shows fault current and trip status as functions of time for a first simulated scenario.

In a first simulated scenario, it is assumed that only the synchronous generator provides power to the power distribution system. The fault 8 occurring downstream of the medium voltage fuse will then cause the latter to blow in 0.87 s. Utilities in a microgrid arena, in particular for islanded grids, are generally adapted to a maximum trip tome of 1 s, so this response is acceptable for utilities. FIG. 6 shows fault current (solid line, left vertical axis) and trip status (dashed line, right vertical axis) as a function of time for this first simulated scenario.

Figure 7:
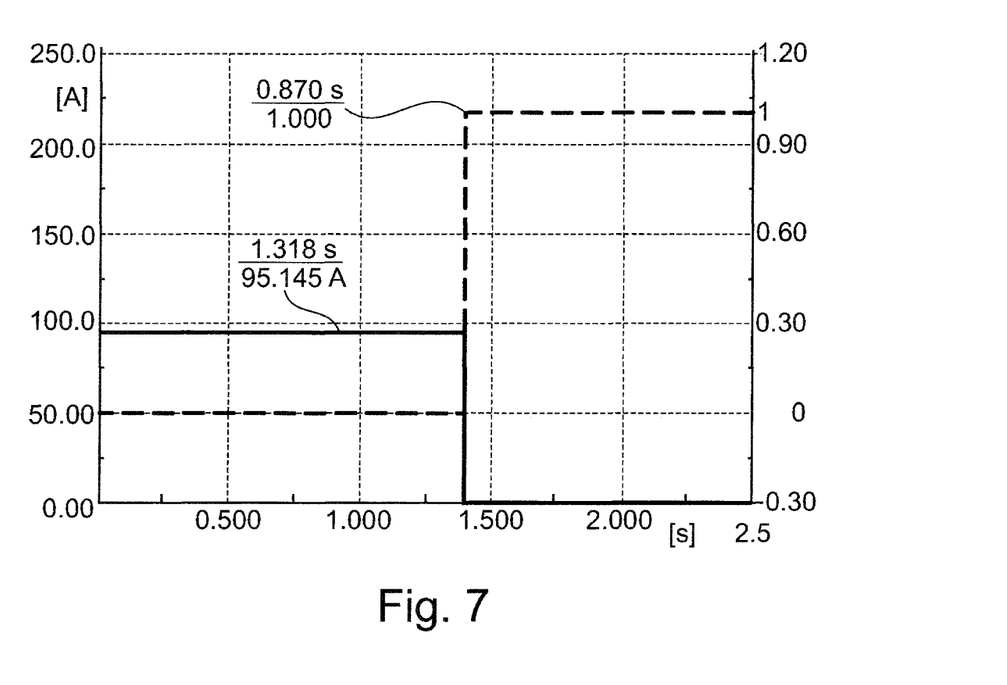
FIG. 7 shows fault current and trip status as functions of time for a second simulated scenario.

In a second simulated scenario, it is assumed that power is provided exclusively by a battery based storage system having an active power rating of $P_{bat}$=1.25 MW and an apparent power rating of $|S_{bat}|$=1.8 MVA, comprising a battery 52 which provides power to the power distribution system via the PE interface 53, which in turn has a current capability of 95 A at 22.0 kV. FIG. 7 shows fault current (solid line, left vertical axis) and trip status (dashed line, right vertical axis) as a function of time for this second simulated scenario. As may be seen the fault current is constant and the trip time is 1.32 seconds which is unacceptable to utilities.

Figure 8:
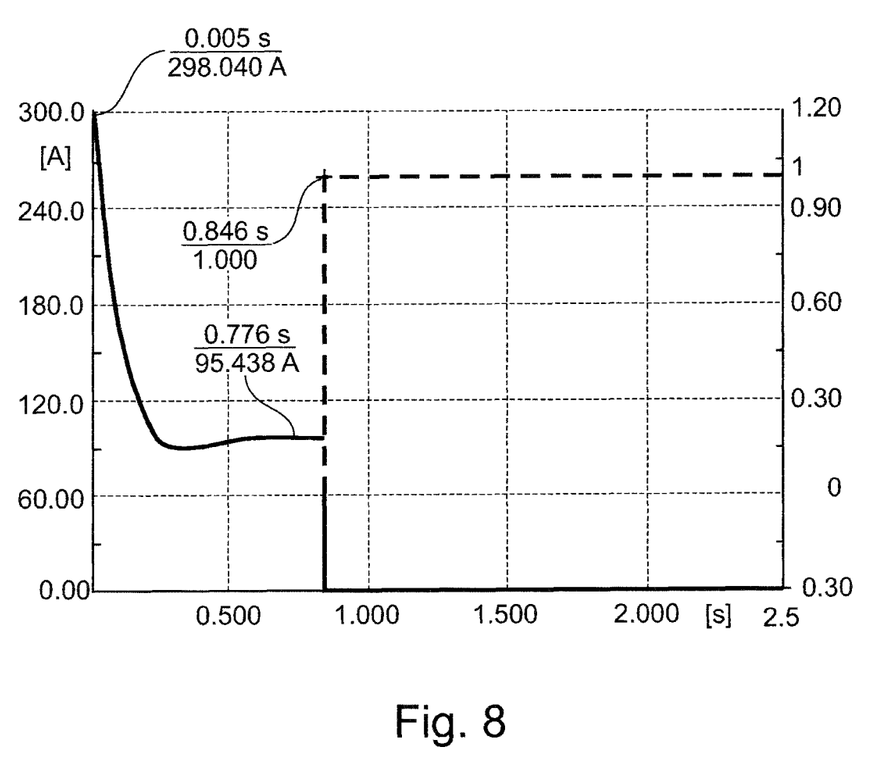
FIG. 8 shows fault current and trip status as functions of time for a third simulated scenario.

In a third simulated scenario, it is assumed that the induction machine 9 is operated in parallel with battery 52 in order to improve the fault current capability. FIG. 8 shows fault current (solid line, left vertical axis) and trip status (dashed line, right vertical axis) as a function of time for this second simulated scenario. As may be seen, the induction machine supplies increased fault current at the start of the fault and makes the fuse blow in 0.85 seconds. This trip time is similar to the synchronous generator alone results and is within the requirement of utilities.

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

Unless stated otherwise, it shall be assumed throughout this entire document that a statement a≈b implies that $|a-b|/(|a|+|b|)<10^{-1}$, preferably $|a-b|/(|a|+|b|)<10^{-2}$, wherein a and b may represent arbitrary variables as described and/or defined anywhere in this document, or as otherwise known to a person skilled in the art. Further, a statement that a is at least approximately equal or at least approximately identical to b implies that a≈b, preferably a=b. Further, unless stated otherwise, it shall assumed throughout this entire document that a statement a»b implies that a>10b, preferably a>100b; and statement a«b implies that 10a<b, preferably 100a<b.

Preferred embodiments of the present invention, in particular as described above, may be realized as detailed in the items listed below, advantageously in combination with one or more of the features as detailed above:

1. A power distribution system with a distribution feeder (1) protected by a protection device (6) against a fault (8) occurring downstream of the protection device, and with a first energy source connected via a Power Electronics PE interface (43, 53) to the distribution feeder upstream of the protection device and causing the protection device to clear the fault within a first fault clearance time,
    characterized in that the power system comprises an Induction Machine IM (9) connected to the distribution feeder upstream of the protection device and adapted to cause, together with the first energy source connected via the PE interface, the protection device to clear the fault within a second fault clearance time following the fault.
2. The power distribution system of item 1, wherein the PE interface or the IM is connected to the distribution feeder via a transformer (12, 13).
3. The power distribution system of item 1, wherein the first energy source includes a wind turbine (41) and wherein the PE interface to the distribution feeder includes a double-fed induction generator.

4. A method of operating a power distribution system with a distribution feeder (1) protected by a protection device (6) against a fault (8) occurring downstream of the protection device, and with a first energy source (41, 52) connected via a Power Electronics PE interface (43, 53) to the distribution feeder upstream of the protection device, comprising connecting an Induction Machine IM (9) to the distribution feeder upstream of the protection device, rotating, during regular operation of the power distribution system, a rotor of the IM;

providing, following the fault and jointly by the first energy source connected via the PE interface and the IM, a composite fault current to clear the fault.

5. The method of item 4, wherein a second energy source is connectable via a synchronous generator (10) to the distribution feeder upstream of the protection device, comprising disconnecting the IM when the synchronous generator is connected to the distribution feeder to provide a fault current to clear the fault.

The invention claimed is:

1. A power distribution system with a distribution feeder protected by a protection device against a fault occurring downstream of the protection device, and with a first energy source connected via a power electronics interface comprising a converter or an inverter to the distribution feeder upstream of the protection device and causing the protection device to clear the fault within a first fault clearance time,
   wherein the power system comprises an induction machine connected to the distribution feeder upstream of the protection device, and adapted to cause, in particular together with the first energy source connected via the power electronics interface, a fault current in the distribution feeder, said fault current causing the protection device to clear the fault within a second fault clearance time following the fault; and
   wherein the induction machine has a first power rating $P_{IM}$ which is at least approximately in the same order of magnitude as a second power rating of the first energy source; and
   the induction machine is configured to neither provide a substantial amount of work to any kind of external equipment or machinery, nor to receive any substantial amount of work by any kind of external equipment or machinery, i.e. with an amount of work $W_{IM}$ provided by or to the induction machine being negligible in comparison to the first power rating $P_{IM}$, i.e. $10W_{IM} < P_{IM}$.

2. The power distribution system of claim 1, wherein the induction machine is configured to operate as a motor during regular operation of the power distribution system.

3. The power distribution system of claim 1, wherein the induction machine is configured to operate as a motor in the absence of a fault.

4. The power distribution system of claim 1, wherein the second fault clearance time is lower than the first fault clearance time.

5. The power distribution system of claim 1, wherein the induction machine is run with no mechanical load, with the exception of a shaft-mounted cooling fan.

6. The power distribution system of claim 1, wherein the induction machine is configured neither to provide nor to receive work to or from any kind of external equipment or machinery.

7. The power distribution system of claim 1, wherein the power electronics interface is connected to the distribution feeder via a transformer.

8. The power distribution system of claim 1, wherein the induction machine is connected to the distribution feeder directly.

9. The power distribution system of claim 1, wherein the induction machine is connected to the distribution feeder via a transformer.

10. The power distribution system of claim 1, wherein the induction machine is connected to the distribution feeder without any power electronic interface, converter or inverter.

11. The power distribution system of claim 1, wherein the first energy source includes a wind turbine and wherein the power electronics interface to the distribution feeder includes a double-fed induction generator.

12. The power distribution system of claim 1, wherein an active power rating of the first energy source and/or the power electronics interface is given by $P_1$, and an active power rating $P_{IM}$ of the induction machine is given by $P_1/10 < P_{IM} < 5\ P_1$.

13. The power distribution system of claim 12, wherein the active power rating $P_{IM}$ of the induction machine is given by $P_1/5 < P_{IM} < 3P_1$.

14. The power distribution system of claim 12, wherein the active power rating $P_{IM}$ of the induction machine is given by $P_1/2 < P_{IM} < 2P_1$.

15. The power distribution system of claim 1, wherein an apparent power rating of the first energy source and/or the power electronics interface is given by and an apparent power rating $|S_{IM}|$ of the induction machine is given by to $|S_1|/10 < |S_{IM}| < 5|S_1|$.

16. The power distribution system of claim 15, wherein the apparent power rating $|S_{IM}|$ of the induction machine is given by $|S_1|/5 < |S_{IM}| <^3 |S_1|$.

17. The power distribution system of claim 15, wherein the apparent power rating $|S_{IM}|$ of the induction machine is given by $|S_1|/2 < |S_{IM}| < 2|S_1|$.

18. The power distribution system of claim 1, wherein the first power rating $P_{IM}$, i.e $100W_{IM} < P_{IM}$.

19. The power distribution system of claim 1, wherein the first power rating $P_{IM}$, i.e $1000W_{IM} < P_{IM}$.

20. The power distribution system of claim 1, wherein the second fault clearance time is less than half of the first fault clearance time.

21. A method of operating a power distribution system with a distribution feeder protected by a protection device against a fault occurring downstream of the protection device, and with a first energy source connected via a power electronics interface comprising converters or inverters to the distribution feeder upstream of the protection device, comprising:

connecting an induction machine to the distribution feeder upstream of the protection device, said induction machine having a first power rating $P_{IM}$ which is at least approximately in the same order of magnitude as a second power rating of the first energy source;

configuring the induction machine to neither provide a substantial amount of work to any kind of external equipment or machinery, nor to receive any substantial amount of work by any kind of external equipment or machinery, i.e. with an amount of work $W_{IM}$ provided by or to the induction machine being negligible in comparison to the first power rating $P_{IM}$, i.e. $10W_{IM} < P_{IM}$;

rotating, during regular operation of the power distribution system, a rotor of the induction machine; and providing, following the fault, a fault current by the induction machine to clear the fault.

22. The method of claim 21, further comprising providing, following the fault and jointly by the first energy source connected via the power electronics interface and the induction machine, a composite fault current to clear the fault.

23. The method of claim 21, wherein the power electronics interface comprises an inverter or a converter.

24. The method of claim 21, wherein a second energy source is connectable via a synchronous generator to the distribution feeder upstream of the protection device, comprising:

disconnecting the induction machine when the synchronous generator is connected to the distribution feeder to provide a fault current to clear the fault.

25. The method of claim 21, wherein the first power rating $P_{IM}$, is $1000W_{IM} < P_{IM}$.

* * * * *